Sept. 3, 1957 M. H. AMES 2,804,799
MOTION PICTURE CAMERA WITH SHIFTING MECHANISM FOR VIEWFINDING
Filed Nov. 8, 1954 4 Sheets-Sheet 1

Inventor
Malcolm H. Ames
by Roberts, Cushman & Grover
Att'ys

Inventor
Malcolm H. Ames
by Roberts, Cushman & Grover
Attys

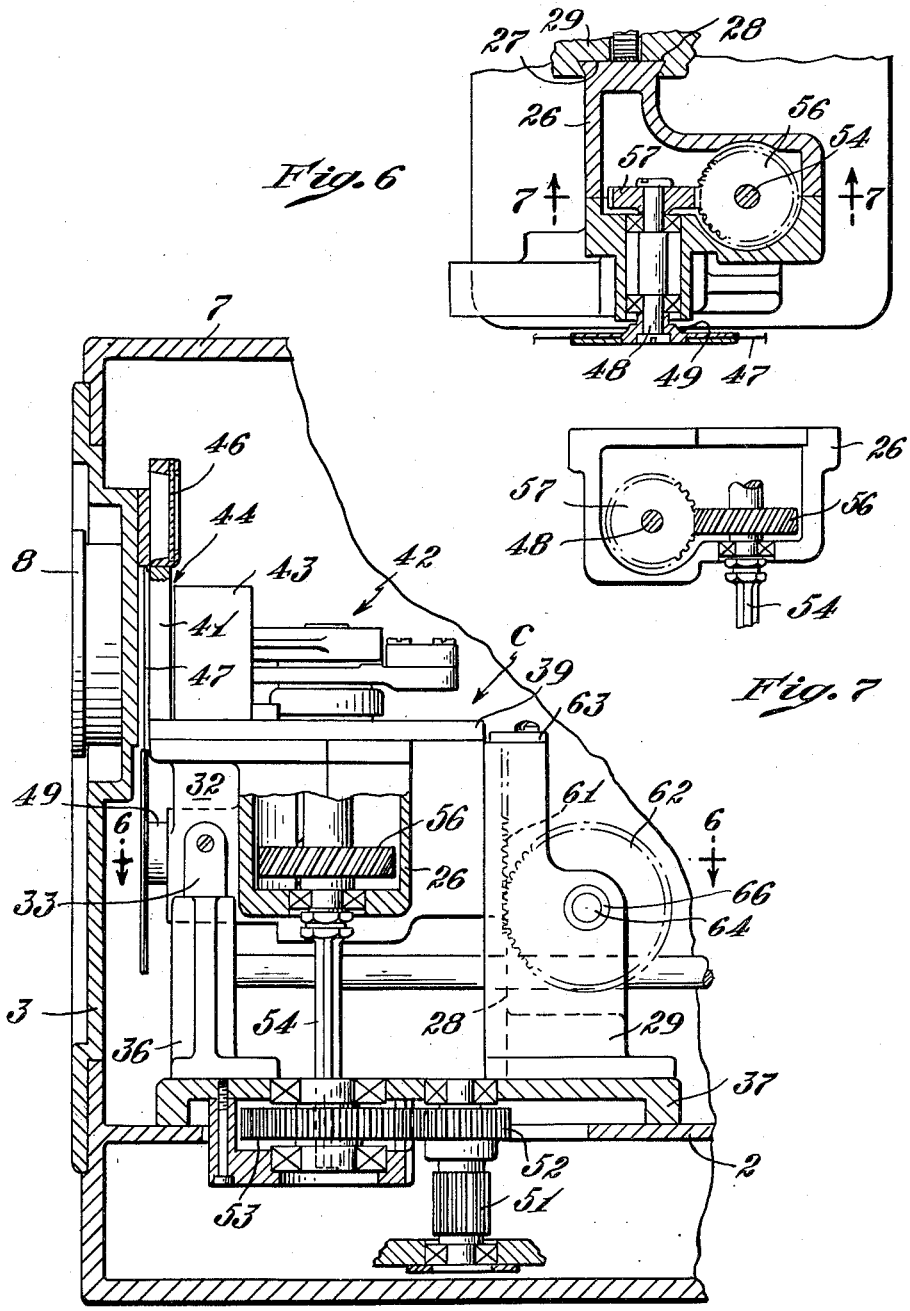

Inventor
Malcolm H. Ames
by Roberts, Cushman & Grover
Att'ys

United States Patent Office 2,804,799
Patented Sept. 3, 1957

2,804,799

MOTION PICTURE CAMERA WITH SHIFTING MECHANISM FOR VIEWFINDING

Malcolm H. Ames, Los Angeles, Calif., assignor to Technicolor Corporation, Hollywood, Calif., a corporation of Maine Application November 8, 1954, Serial No. 467,360

11 Claims. (Cl. 88—16)

This invention relates to motion picture cameras of the type in which the same lens serves for both view finding and picture taking purposes, and more particularly to cameras in which the film gate and film-feeding mechanism is movable out of the optical axis for view finding purposes.

According to the present invention the taking lens is mounted on the camera housing with its optical axis extending into the housing to form an image in a focal plane inside the housing as usual, and a carriage is movably mounted in the housing to move in a predetermined direction transversely of the optical axis between advanced and retracted positions, the camera including a viewing lens for observing the image when the carriage is in retracted position, a film gate on the carriage in alignment with the lens when the carriage is in advanced position, means on the carriage for feeding film through the film gate along a path which extends transversely of both the aforesaid axis and direction, means including a stop movable into the path of the carriage to hold it in advanced position, and means to render the film-feeding mechanism inoperative when the stop moves from holding position. Preferably the latter means includes a switch for controlling the film-feeding motor, the switch being actuated by the stop means when the stop means moves from holding position. In the preferred embodiment the carriage movement is up and down, the advanced position being at the upper end of the movement and the retracted position being at the bottom.

In a more specific aspect the apparatus comprises actuating means to move the carriage from advanced to retracted position and means interlocking the stop means and actuating means so that the actuating means cannot be moved until the stop is moved out of the path of the carriage. In the preferred embodiment the aforesaid stop comprises a wedge or other cam adapted to force the carriage firmly into advanced position.

For the purpose of illustration a typical embodiment of the invention is shown in the accompanying drawings in which Fig. 1 is a plan view with the cover removed, with the front end of the housing sectioned on the optical axis, and with the intermittent film-feeding mechanism removed;

Fig. 5 is a section on line 5—5 of Fig. 3, showing the carriage in advanced position;

Fig. 6 is a section on line 6—6 of Fig. 5;

Fig. 7 is a section on line 7—7 of Fig. 6;

Figure 1:
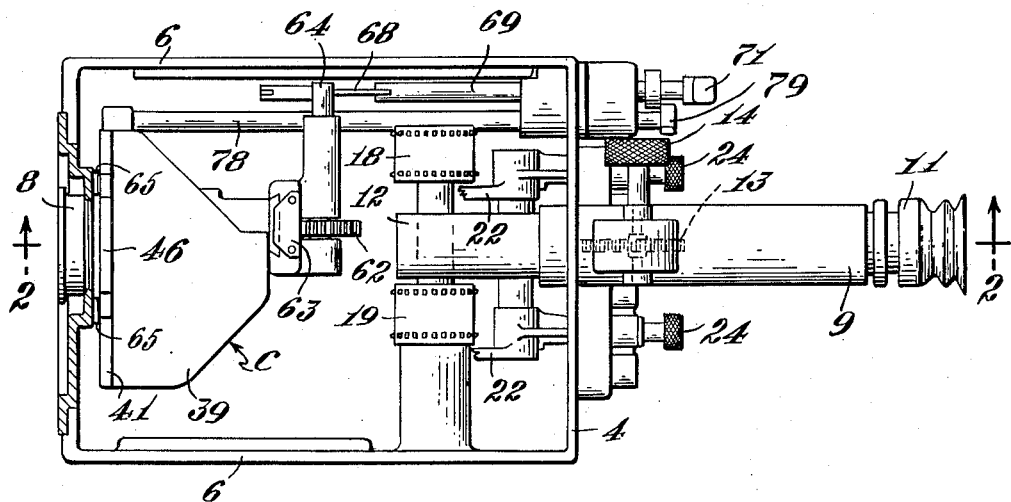
Figure 2:
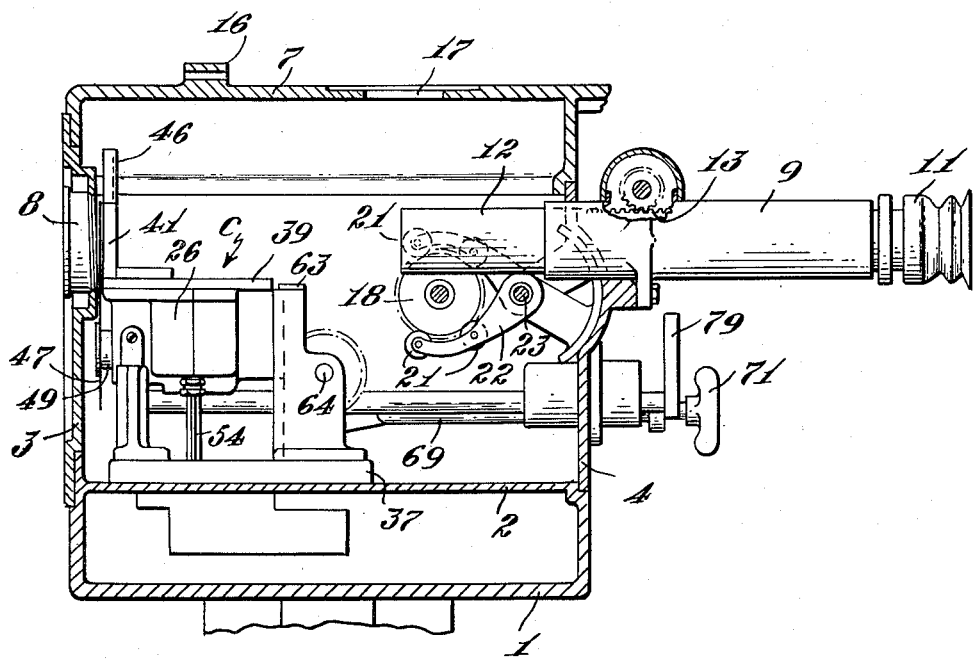
Fig. 2 is a section on line 2—2 of Fig. 1 with the carriage lifted to advanced taking position and the intermittent film-feeding mechanism removed.
Figure 3:
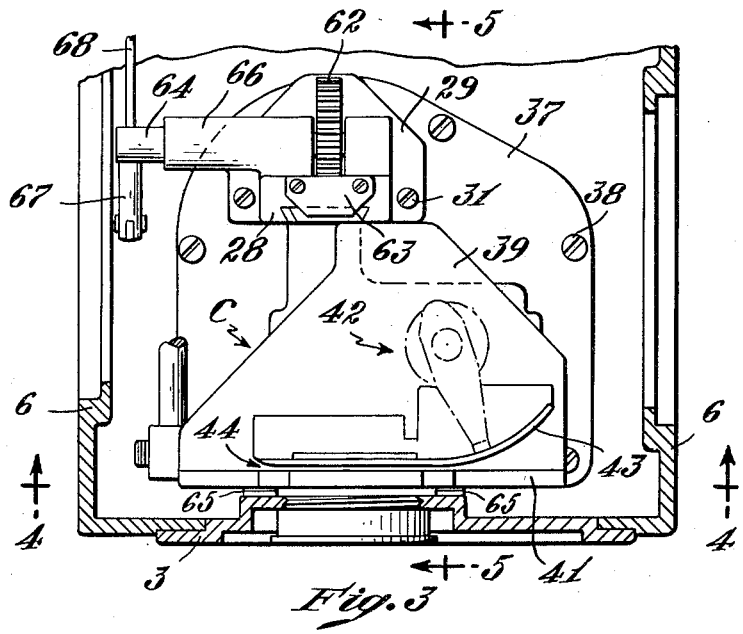
Fig. 3 is a section on line 3—3 of Fig. 4.

The particular embodiment of the invention chosen for the purpose of illustration comprises a housing consisting of a bottom including two spaced horizontal walls 1 and 2, a front wall 3, a back wall 4, side walls 6 and a removable cover 7, the side walls having openings for doors (Fig. 3). Mounted on the front wall is the main lens 8 and on the rear wall a tube 9 carrying an eyepiece 11. Telescoping in the tube 9 is a focusing tube 12 adjustable back and forth by means of a rack and pinion 13 and an actuating knob 14, the tubes 9 and 12 being coaxial with the lens 8. The cover 7 has a lug 16 to which a film magazine may be secured and an opening 17 through which film may feed to and from the camera mechanism.

The film is fed by means of sprocket wheels 18 and 19, wheel 18 feeding the film from the magazine to the film gate and wheel 19 feeding the film from the film gate back to the take-up reel in the magazine. Associated with each sprocket wheel are rollers 21 for holding the film against the wheel, the rollers being mounted on scissor-like arms 22 pivoted on shaft 23 so that the rollers can be swung away from the sprockets for threading purposes. The arms 22 are held in normal positions by plungers 24 which are pulled out to release the arms. The aforesaid mechanism is fully disclosed in Patent 2,072,091, further description is unnecessary for the purpose of the present disclosure.

Figure 8:
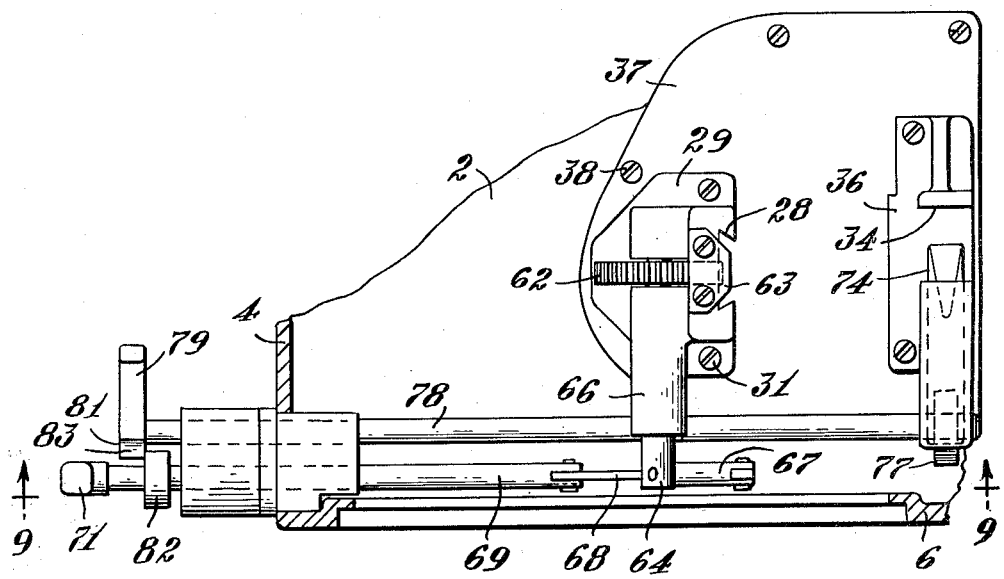
Fig. 8 is a top plan view with the carriage removed and the housing in section.

In the drawings the aforesaid carriage is indicated generally by the letter C. It comprises a housing 26 having a horizontal cross-section such as shown in Fig. 6 with a vertically extending dovetail 27 at the rear which is slidable in the dovetail guide 28 on the front of the bracket 29 secured by screws 31 (Fig. 8). Extending forwardly from the housing is a vertical rib 32 which carries on its sides bearing plates 33 slidable on the opposite sides of a slide way 34 (Fig. 4) formed in the bracket 36. Both of the brackets 29 and 36 are mounted on a hollow base 37 which is mounted on the wall 2 by means of screws 38 (Fig. 3).

Fastened to the top of the housing 26 is a plate 39 upon which is mounted an aperture plate 41 having an aperture 40 and the intermittent film-feeding mechanism 42 of any suitable construction, the mechanism comprising a curved film guide 43 spaced from the aperture plate 41 to provide a passageway 44 for the film. Mounted on top of the aperture plate 41 is a ground glass 46 in the same vertical plane as the film passageway 44. When the carriage is in the upper position shown in the drawings the aperture in plate 41 is centered on the optical axis of lens 8 and when the carriage is lowered to retracted position the ground glass 46 is centered on the optical axis. The shutter 47 is mounted in front of the carriage on a shaft 48 by means of a holder 49 (Fig. 6).

The camera mechanism is driven through the main gear 51 and gears 52 and 53 mounted as shown in Fig. 5. Sliding through the gear 53 is a splined shaft 54 which drives the intermittent film-feeding mechanism 42 and also carries a gear 56 within the housing 26. Meshing with the gear 56 is a gear 57 which drives the shutter 47 as shown in Figs. 6 and 7.

Figure 9:
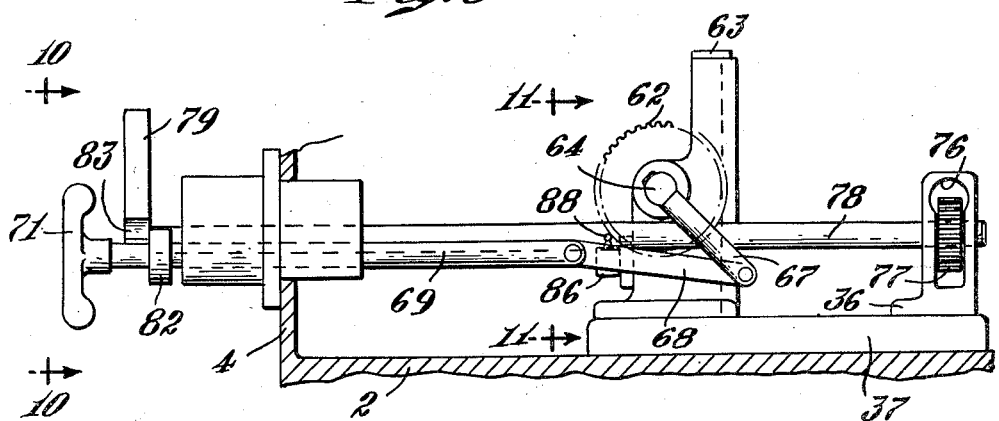
Fig. 9 is a section on line 9—9 of Fig. 8.

The carriage is raised to advanced position by means of a rack 61 on the rear of the carriage (Fig. 5) and a pinion 62 meshing with the rack, stops being provided to limit the upward movement of the carriage. These stops comprise blocks 60 fast to the carriage C and blocks 65 fast to the front wall 3 (Figs. 3 and 4) and an auxiliary stop 63 at the rear (Figs. 5, 8 and 9). The gear 62 is mounted on a shaft 64 which is journaled in bearings 66 on bracket 29. The pinion is actuated by means of an arm 67 on the end of the shaft, the arm being connected through a link 68 to a plunger 69 having a handle 71 outside the rear wall of the camera housing. To lower the carriage from advanced to retracted position the plunger 69 is pulled out and to return it to advanced position the plunger is pushed in.

Figure 4:
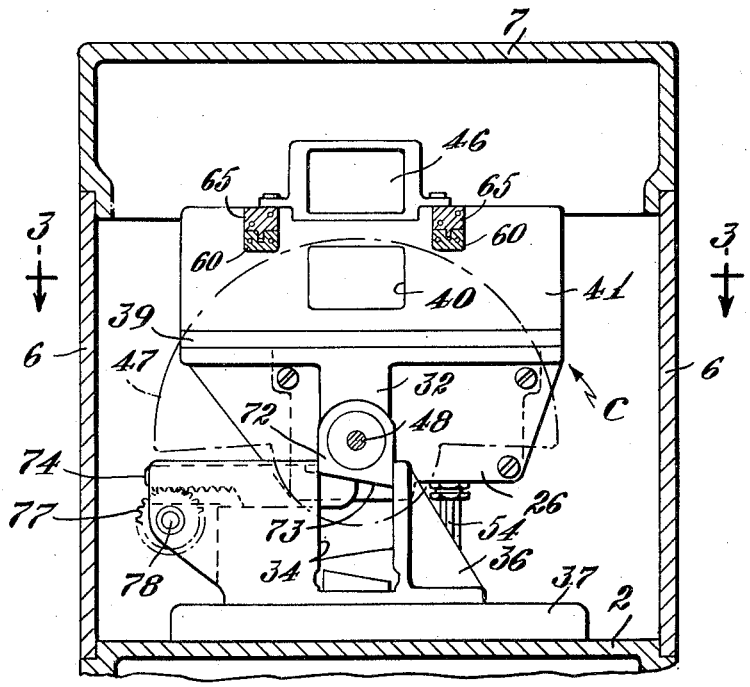
Fig. 4 is a section on line 4—4 of Fig. 3, showing the carriage in advanced position.
Figure 10:
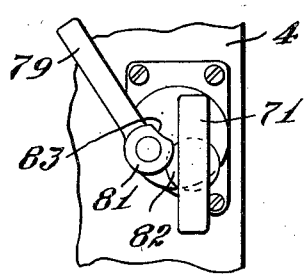
Fig. 10 is a rear elevation viewed from the line 10—10 of Fig. 9.

As shown in Fig. 4 a bearing block 72 is mounted on the forward face of the rib 32, the block having an inclined bearing face 73 on its lower side. Cooperating with this face is a plunger 74 having at its inner end a cam or wedge surface inclined at the same angle as 73. As shown in Figs. 4, 8 and 9, the plunger 74 slides in an opening 76 in the bracket 36. The plunger is actuated by means of a rack and pinion 77, the pinion being turned by a shaft 78 and a handle 79 outside the rear wall of the carrier housing. When the plunger 74 is advanced to lock the carriage in its upper position against the stop 63 the handle 79 is in the counterclockwise position shown in Fig. 10. In this position the handle 71 cannot be pulled out to lower the carriage because the hub 81 of the handle is in the path of the collar 82 on the plunger 69 (Figs. 8, 9 and 10). However, the hub 81 has a recess 83 which, when the handle 79 is swung to the clockwise position to retract the wedge 74 from the path of the carriage, registers with the collar 82 on the plunger 69 so that the plunger can then be pulled out to lower the carriage from advanced to retracted position. Thus the plunger 69 cannot be operated to actuate the carriage from advanced position while the wedge 74 is in advanced position.

Figure 11:
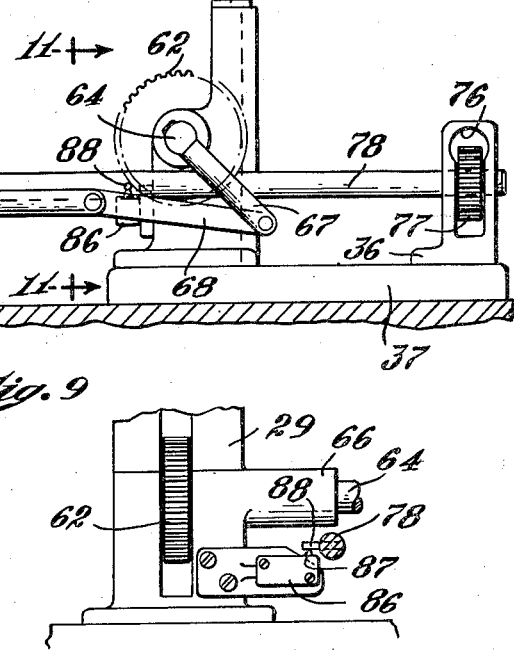
Fig. 11 is a section on line 11—11 of Fig. 9.

As shown in Figs. 9 and 11, a switch 86 is mounted on the bracket 29 with a projecting button 87 which when pressed inwardly closes the switch. Mounted on the side of shaft 78 is a finger 88 which, when the wedge 74 is fully advanced into the path of the carriage, engages the button 87 to close the switch. By connecting this switch into the circuit of the motor which drives the gear 51 the driving mechanism is rendered inoperative when the wedge 74 moves from the locking position shown in Fig. 4 and remains inoperative until the wedge returns to this position.

It should be understood that the present disclosure is for the purpose of illustration only and that the invention includes all modifications and equivalents which fall within the scope of the appended claims.

I claim:

1. A motion picture camera comprising a housing, a taking lens mounted on the housing with its optical axis extending into the housing to form an image in a focal plane inside the housing, a carriage movably mounted in the housing to move in a predetermined direction transversely of said axis between advanced and retracted positions, a viewing lens for observing said image when the carriage is in retracted position, a film gate on the carriage in alignment with said lens when the carriage is in advanced position, means on the carriage for feeding film through the film gate along a path which extends transversely of said axis and said direction, a motor for driving said film-feeding means, a switch for controlling the motor, and stop means including a stop movable into the path of the carriage to hold it in advanced position, the stop means including means to open said switch when the stop moves from holding position.

2. A motion picture camera comprising a housing, a taking lens mounted on the housing with its optical axis extending into the housing to form an image in a focal plane inside the housing, a carriage movably mounted in the housing to move in a predetermined direction transversely of said axis between advance and retracted positions, a film gate on the carriage in alignment with said lens when the carriage is in advanced position, means on the carriage for feeding film through the film gate along a path which extends transversely of said axis and said direction, a viewing lens for observing said image when the carriage is in retracted position, stop means including a stop movable into the path of the carriage to hold it in advanced position, actuating means to move the carriage from one position to the other, and means interlocking said stop means and actuating means so that the actuating means cannot be moved until the stop is moved out of the path of the carriage.

3. A motion picture camera comprising a housing, a taking lens mounted on the housing with its optical axis extending into the housing to form an image in a focal plane inside the housing, a carriage movably mounted in the housing to move in a predetermined direction transversely of said axis between advanced and retracted positions, a film gate on the carriage in alignment with said lens when the carriage is in advanced position, means on the carriage for feeding film through the film gate along a path which extends transversely of said axis and said direction, a viewing lens for observing said image when the carriage is in retracted position, a motor for driving said film-feeding means, a switch for controlling the motor, stop means including a stop movable into the path of the carriage to hold it in advanced position, the stop means including means to open said switch when the stop moves from holding position, actuating means to move the carriage from one position to the other, and means interlocking said stop means and actuating means so that the actuating means cannot be moved until the stop is moved out of the path of the carriage.

4. A motion picture camera comprising a housing, a taking lens mounted on the housing with its optical axis extending into the housing to form an image in a focal plane inside the housing, a carriage movably mounted in the housing to move in a predetermined direction transversely of said axis between advanced and retracted positions, a film gate on the carriage in alignment with said lens when the carriage is in advanced position, means on the carriage for feeding film through the film gate along a path which extends transversely of said axis and said direction, a viewing lens for observing said image when the carriage is in retracted position, stop means including a stop movable into the path of the carriage to hold it in advanced position, actuating means to move the carriage from advanced to retracted position, and means interlocking said stop means and actuating means so that the actuating means cannot be moved until the stop is moved out of the path of the carriage and the film-feeding means is rendered inoperative when the stop moves from holding position.

5. A motion picture camera comprising a housing, a taking lens mounted on the housing with its optical axis extending into the housing to form an image in a focal plane inside the housing, a carriage movably mounted in the housing to move in a predetermined direction transversely of said axis between advanced and retracted positions, a film gate on the carriage in alignment with said lens when the carriage is in advanced position, means on the carriage for feeding film through the film gate along a path which extends transversely of said axis and said direction, a viewing lens for observing said image when the carriage is in retracted position, a motor for driving said film-feeding means, a switch for controlling the motor, stop means including a stop movable into the path of the carriage to hold it in advanced position, the stop means including means to open said switch when the stop moves from holding position, actuating means to move the carriage from advanced to retracted position, and means interlocking said stop means and actuating means so that the actuating means cannot be moved until the stop is moved out of the path of the carriage and the film-feeding means is rendered inoperative when the stop moves from holding position.

6. A motion picture camera comprising a housing, a taking lens mounted on the housing with its optical axis extending into the housing to form an image in a focal plane inside the housing, a carriage movably mounted in the housing to move in a predetermined direction transversely of said axis between advanced and retracted positions, a viewing lens for observing said image when the carriage is in retracted position, a film gate on the carriage in alignment with said lens when the carriage is in advanced position, means on the carriage for feeding film through the film gate along a path which extends transversely of said axis and said direction, a motor for driving said film-feeding means, a switch for controlling the motor, and cam means including a cam movable into the path of the carriage to hold it in advanced position, the cam means including means to open said switch when the cam moves from holding position.

7. A motion picture camera comprising a housing, a taking lens mounted on the housing with its optical axis extending into the housing to form an image in a focal plane inside the housing, a carriage movably mounted in the housing to move in a predetermined direction transversely of said axis between advanced and retracted positions, a film gate on the carriage in alignment with said lens when the carriage is in advanced position, means on the carriage for feeding film through the film gate along a path which extends transversely of said axis and said direction, a viewing lens for observing said image when the carriage is in retracted position, cam means including a cam movable into the path of the carriage to hold it in advanced position, actuating means to move the carriage from one position to the other, and means interlocking said cam means and actuating means so that the actuating means cannot be moved until the cam is moved out of the path of the carriage.

8. A motion picture camera comprising a housing, a taking lens mounted on the housing with its optical axis extending into the housing to form an image in a focal plane inside the housing, a carriage movably mounted in the housing to move in a predetermined direction transversely of said axis between advanced and retracted positions, a film gate on the carriage in alignment with said lens when the carriage is in advanced position, means on the carriage for feeding film through the film gate along a path which extends transversely of said axis and said direction, a viewing lens for observing said image when the carriage is in retracted position, a motor for driving said film-feeding means, a switch for controlling the motor, cam means including a cam movable into the path of the carriage to hold it in advanced position, the cam means including means to open said switch when the cam moves from holding position, actuating means to move the carriage from one position to the other, and means interlocking said cam means and actuating means so that the actuating means cannot be moved until the cam is moved out of the path of the carriage.

9. A motion picture camera comprising a housing, a taking lens mounted on the housing with its optical axis extending into the housing to form an image in a focal plane inside the housing, a carriage movably mounted in the housing to move in a predetermined direction transversely of said axis between advanced and retracted positions, a viewing lens for observing said image when the carriage is in retracted position, a film gate on the carriage in alignment with said lens when the carriage is in advanced position, means on the carriage for feeding film through the film gate along a path which extends transversely of said axis and said direction, a motor for driving said film-feeding means, a switch for controlling the motor, and wedge means including a wedge movable into the path of the carriage to hold it in advanced position, the wedge means including means to open said switch when the wedge moves from holding position.

10. A motion picture camera comprising a housing, a taking lens mounted on the housing with its optical axis extending into the housing to form an image in a focal plane inside the housing, a carriage movably mounted in the housing to move in a predetermined direction transversely of said axis between advanced and retracted positions, a film gate on the carriage in alignment with said lens when the carriage is in advanced position, means on the carriage for feeding film through the film gate along a path which extends transversely of said axis and said direction, a viewing lens for observing said image when the carriage is in retracted position, wedge means including a wedge movable into the path of the carriage to hold it in advanced position, actuating means to move the carriage from one position to the other, and means interlocking said wedge means and actuating means so that the actuating means cannot be moved until the wedge is moved out of the path of the carriage.

11. A motion picture camera comprising a housing, a taking lens mounted on the housing with its optical axis extending into the housing to form an image in a focal plane inside the housing, a carriage movably mounted in the housing to move in a predetermined direction transversely of said axis between advanced and retracted positions, a film gate on the carriage in alignment with said lens when the carriage is in advanced position, means on the carriage for feeding film through the film gate along a path which extends transversely of said axis and said direction, a viewing lens for observing said image when the carriage is in retracted position, a motor for driving said film-feeding means, a switch for controlling the motor, wedge means including a wedge movable into the path of the carriage to hold it in advanced position, the wedge means including means to open said switch when the cam moves from holding position, actuating means to move the carriage from one position to the other, and means interlocking said wedge means and actuating means so that the actuating means cannot be moved until the wedge is moved out of the path of the carriage.

References Cited in the file of this patent

UNITED STATES PATENTS

| | | |
|---|---|---|
| 1,359,392 | Lawhun | Nov. 16, 1920 |
| 2,089,106 | Beck | Aug. 3, 1937 |
| 2,239,788 | Kerrins | Apr. 29, 1941 |

FOREIGN PATENTS

| | | |
|---|---|---|
| 484,625 | Germany | Oct. 22, 1929 |
| 388,296 | Great Britain | Feb. 23, 1933 |